(12) United States Patent
Carota

(10) Patent No.: US 9,990,011 B2
(45) Date of Patent: Jun. 5, 2018

(54) DRIVE ARRAY

(71) Applicant: Lawrence Anthony Carota, North Vancouver (CA)

(72) Inventor: Lawrence Anthony Carota, North Vancouver (CA)

( * ) Notice: Subject to any disclaimer, the term of this patent is extended or adjusted under 35 U.S.C. 154(b) by 0 days. days.

(21) Appl. No.: 15/101,852

(22) PCT Filed: Dec. 5, 2014

(86) PCT No.: PCT/CA2014/000871
§ 371 (c)(1),
(2) Date: Jun. 3, 2016

(87) PCT Pub. No.: WO2015/081422
PCT Pub. Date: Jun. 11, 2015

(65) Prior Publication Data
US 2016/0299541 A1    Oct. 13, 2016

(30) Foreign Application Priority Data
Dec. 5, 2013    (CA) ..................................... 2835982

(51) Int. Cl.
*G06F 1/18*    (2006.01)
*G11B 33/12*    (2006.01)
*G11B 33/14*    (2006.01)
*G11B 33/02*    (2006.01)

(52) U.S. Cl.
CPC ............ *G06F 1/183* (2013.01); *G11B 33/027* (2013.01); *G11B 33/128* (2013.01); *G11B 33/1426* (2013.01)

(58) Field of Classification Search
CPC . G06F 1/183; G06F 1/20; G06F 1/187; G11B 33/027; G11B 33/1426; G11B 33/128; G11B 33/08; F21V 29/75; H05K 7/1487; H05K 1/0203
See application file for complete search history.

(56) References Cited

U.S. PATENT DOCUMENTS

| 6,373,696 | B1 | 4/2002 | Bolognia et al. | |
|---|---|---|---|---|
| 7,304,855 | B1* | 12/2007 | Milligan | G11B 33/128 361/724 |
| 7,675,748 | B2 | 3/2010 | Matsushima et al. | |
| 2005/0114876 | A1 | 5/2005 | Atarashi et al. | |
| 2007/0014085 | A1* | 1/2007 | Meserth | G06F 1/184 361/679.35 |
| 2007/0127202 | A1* | 6/2007 | Scicluna | G06F 1/184 361/679.37 |

(Continued)

*Primary Examiner* — Dimary Lopez Cruz
*Assistant Examiner* — Abhishek Rathod
(74) *Attorney, Agent, or Firm* — Maschoff Brennan

(57) ABSTRACT

A drive array is provided, including: a structure having a top panel, a base; and first and second side panels; the first and second side panels positioned on opposite sides of the array and defining a length of the array; and a plurality of fins arranged transversely to the length of the array, the fins further arranged in a plurality of rows, each of the rows transverse to the array; a plurality of projections extending upwardly from the base aligned with a plurality of projections extending downwardly from the top penal, positioned to fit and hold a hard drive; and a circuit board secured to the back of the structure to communicate with the hard drives positioned on the array.

10 Claims, 17 Drawing Sheets

(56) References Cited

U.S. PATENT DOCUMENTS

| | | | |
|---|---|---|---|
| 2009/0059604 A1* | 3/2009 | Yu ............................ | F21K 9/00 |
| | | | 362/373 |
| 2009/0228674 A1 | 10/2009 | Ouchi | |
| 2010/0296287 A1* | 11/2010 | Huang .................. | F21V 15/013 |
| | | | 362/249.02 |
| 2012/0138493 A1* | 6/2012 | Tung-Ke .............. | G11B 33/124 |
| | | | 206/320 |
| 2013/0258620 A1* | 10/2013 | Qiu ........................ | G06F 1/187 |
| | | | 361/759 |

\* cited by examiner

DRIVE ARRAY

FIELD OF THE INVENTION

This invention relates to hard drive arrays, and more particularly to mobile hard drive arrays for use outside of temperature controlled environments.

BACKGROUND OF THE INVENTION

Hard drive arrays are commonly used to store information, and communicate that information with servers or other computers. Drive arrays in the art typically store a plurality of drives (normally 8, 16 or 24), placed adjacent to one another in a horizontal row or vertical column. Mobile servers and their accompanying hard drive arrays are becoming frequently used, particularly in industries like the film industry where large quantities of newly generated data must be stored.

Hard drives in use generate both heat and noise, and it is important that the temperature of and around the drives be controlled, as they may otherwise overheat and fail. The drives are often very tightly individually packed into metal trays, which are then inserted into an enclosed array that is typically made of steel. The hard drives stored within such arrays are normally kept cool using either air flow or cooled liquid.

Drive arrays that use liquid cooling require that the drives be isolated from the liquid to prevent direct contact. In such cases, typically each drive will be placed within its own housing. When positioning such arrays, they must be located near a liquid source if they are going to be in use for a length of time. Furthermore, as each drive is encased individually, the storage space per drive is increased.

Air cooled drive arrays are often located in cool locations, such as air conditioned rooms or warehouses, which may not be available when using mobile servers and portable drives. Furthermore, large fans are often placed near the drive array to circulate air, as heat dissipation for air cooled hard drives usually involves blowing air across the surface of the drive. Alternatively a large number of small fans operated at very high revolutions per minute (RPMs) may be used to push air by and though the small spaces between the hard drives to help control the heat. The more processing of data done by the drives, the more heat produced and thus the faster the fans must turn to help cool the drives.

For the reasons described above, servers and hard drive arrays face difficulties when used in locations not suited for a cool environment. For example film crews require servers and drive arrays for storing the content created, however they are not usually in locations artificially cooled (and may even be outdoors in very hot environments, such as deserts), and the drives and arrays cannot be so loud so as to interrupt filming (thus also preventing the use of noisy fans). Furthermore the array should be easily transportable so that, for example, an individual can place the array in carry-on luggage.

SUMMARY OF THE INVENTION

A drive array is provided, having shock-mountings to prevent damage to spinning and solid state (SSD) hard drives and minimizing vibration and noise. A light weight structure supports and protects a hard drive backplane circuit board, and a plurality of individual hot-swappable 3½" or 2½" hard drives, while absorbing British Thermal Units (BTUs) of heat, and passing on the heat to individual heat fins thereby rapidly dissipating the heat generated by the intensive read/write activity within the hard drives.

A drive array is provided, including: a structure having a top panel, a base; and first and second side panels; the first and second side panels positioned on opposite sides of the array and defining a length of the array; and a plurality of fins arranged transversely to the length of the array, the fins further arranged in a plurality of rows, each of the rows transverse to the array; a plurality of projections extending upwardly from the base aligned with a plurality of projections extending downwardly from the top panel, positioned to define a slot to fit and hold a hard drive; and a back plane circuit board secured to the back of the structure to communicate with the hard drives positioned on the array.

The projections may be positioned to hold a ½ inch or 2½ inch hard drive. The base may be elevated on a plurality of blocks. A second plurality of fins may extend downwardly from the base, arranged transversely to the length of the array, the fins further arranged in a plurality of rows, each of the rows transverse to the array.

The drive array may have first and second shocks elements, the first and second shock elements mounted on opposite sides of the array on the plurality of blocks; and the drive array may further include a groove in the base, the groove positioned to receive and support the back plane circuit board.

The drive array may include a tray sized to fit in the slots, the tray sized to receive secure, and hold a hard drive in individual slots keeping the hard drives from moving forward into the back plane circuit board. The front side of the tray may have a plurality of perforations to allow air flow to and to dissipate heat from the drive therein. The drive array may include a cross bar positionable at a side of the array opposite the groove to lock the hard drives into position.

DETAILED DESCRIPTION OF THE INVENTION

Figure 1:
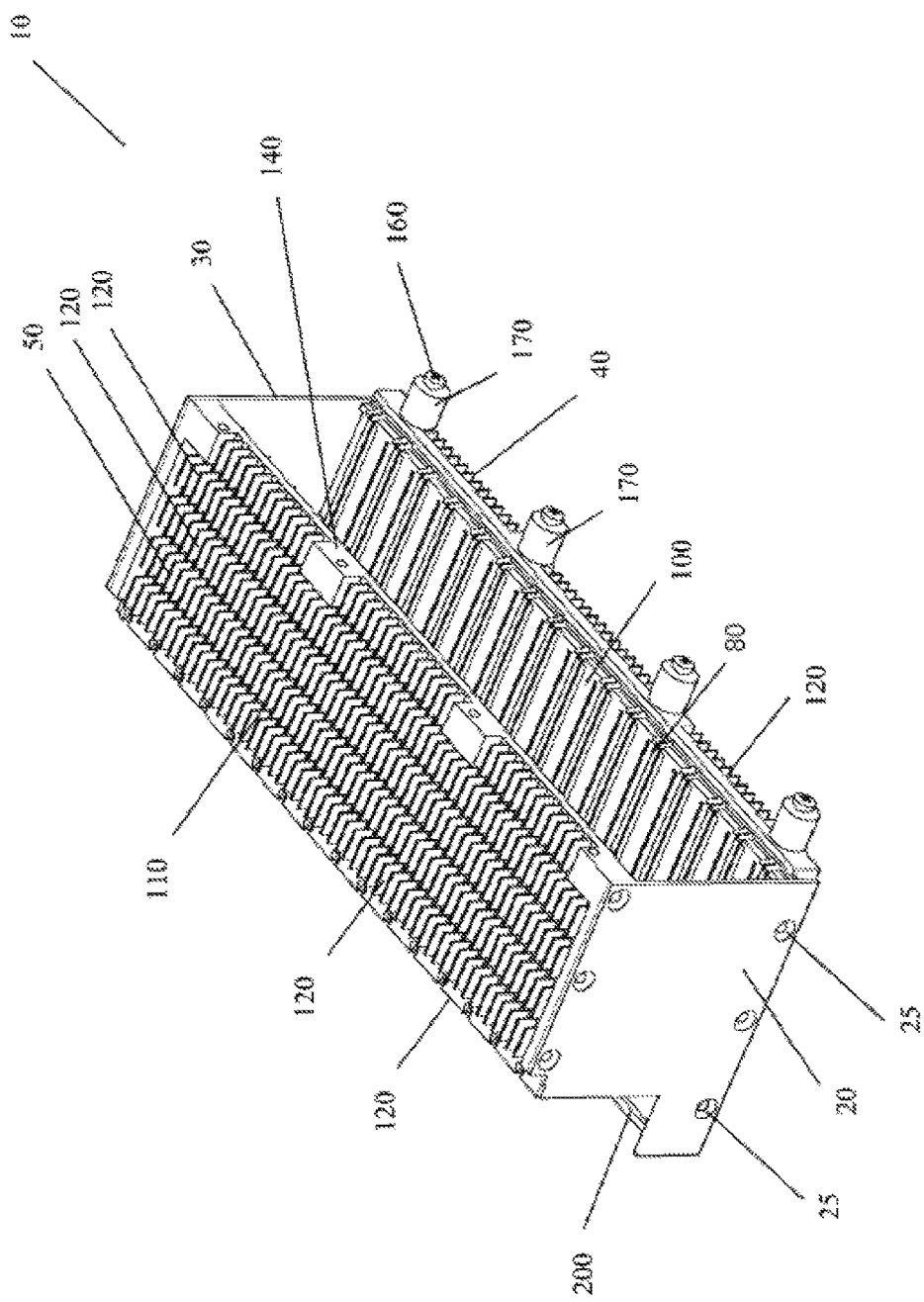
FIG. 1 is a front perspective view of an embodiment of a drive array according to the invention.
Figure 2:
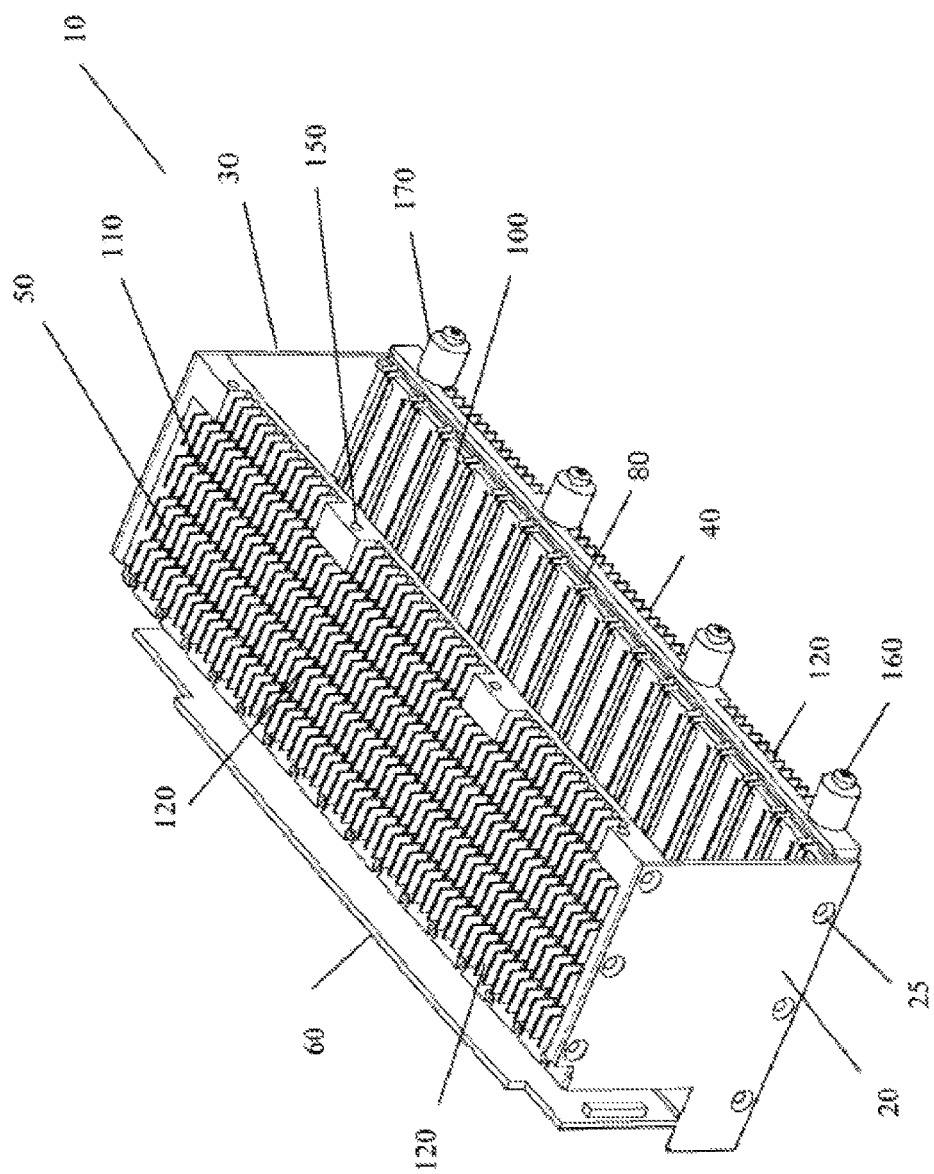
FIG. 2 is a front perspective view thereof wherein a circuit board is attached.
Figure 3:
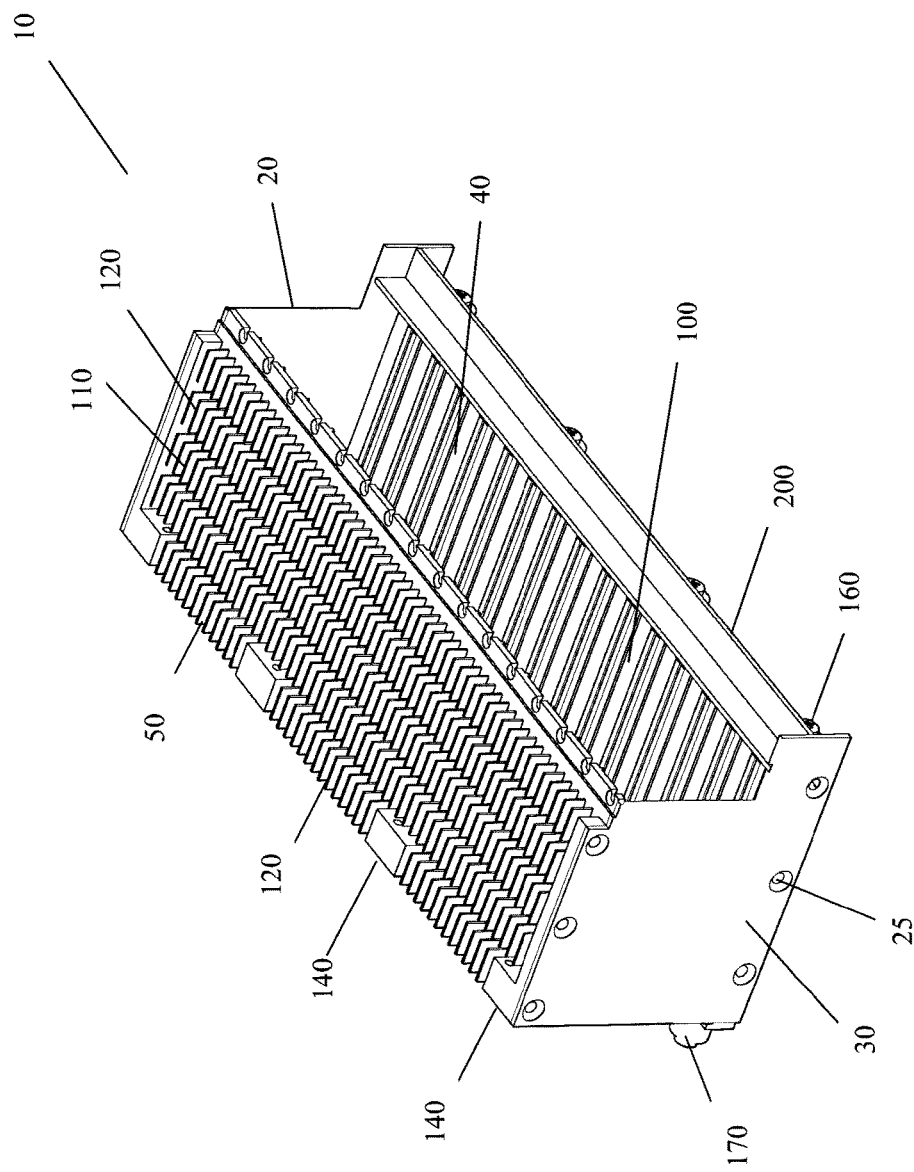
FIG. 3 is a rear perspective view thereof.
Figure 4:
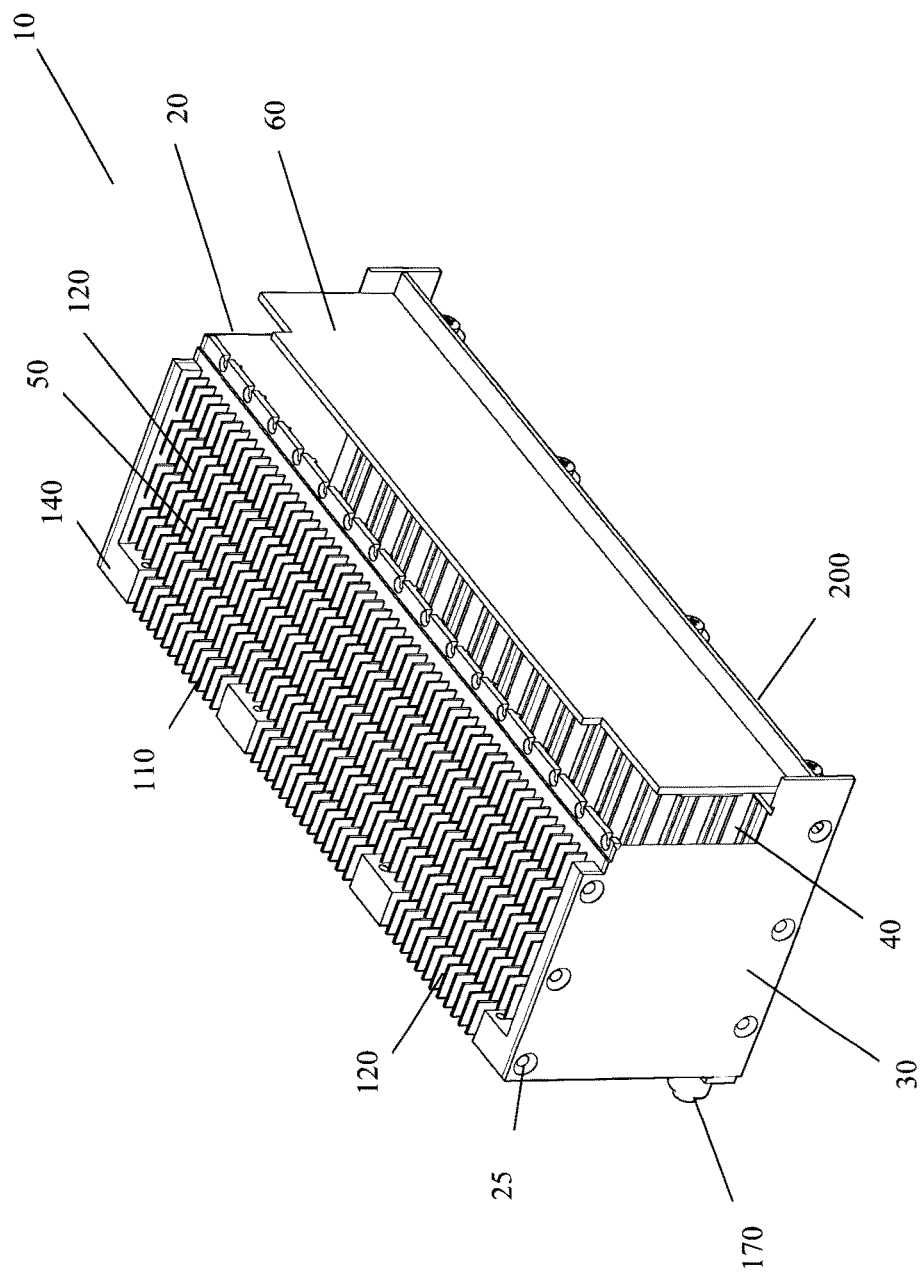
FIG. 4 is a rear perspective view wherein a circuit board is attached.
Figure 5:
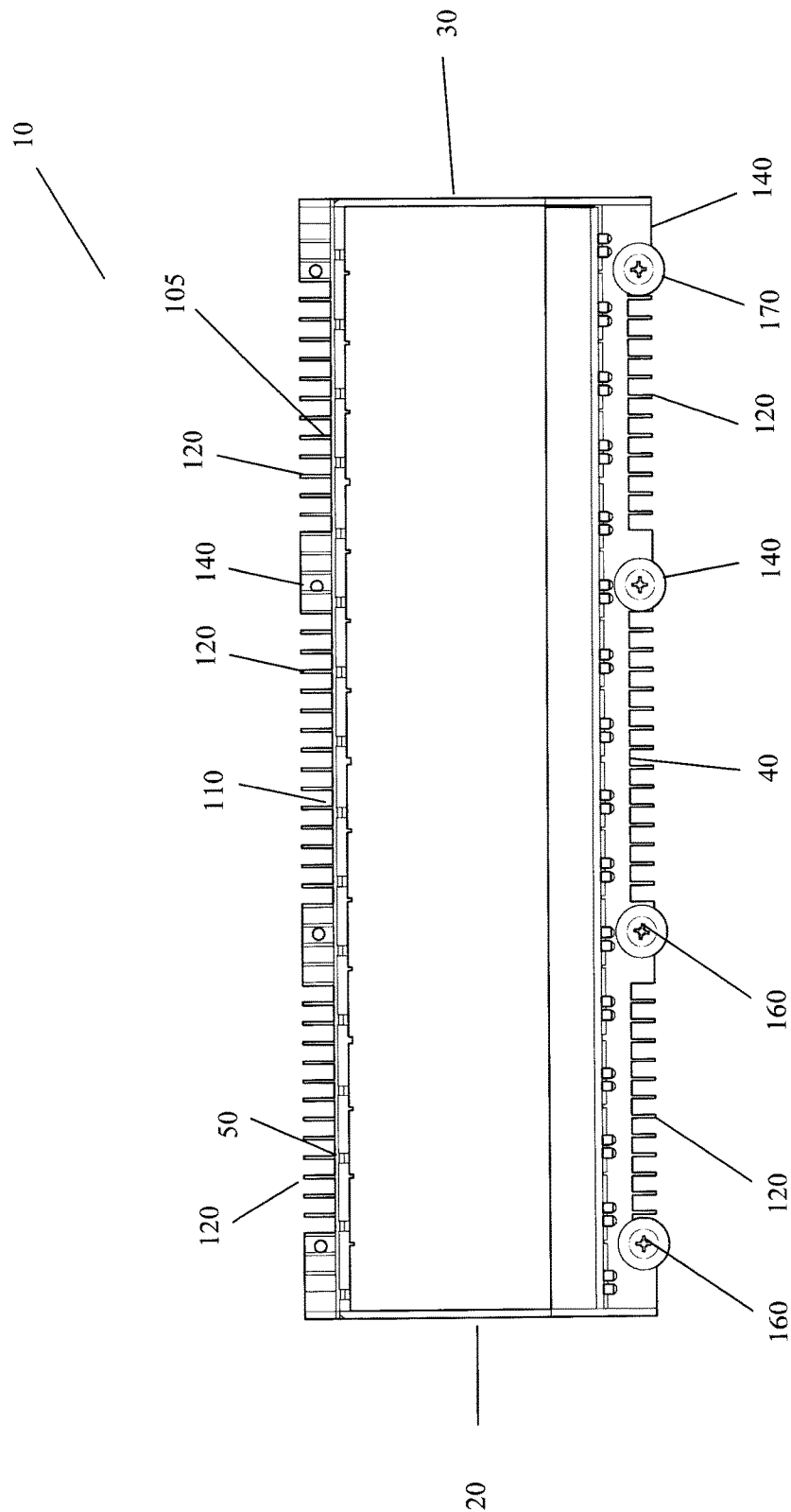
FIG. 5 is a front view thereof.
Figure 6:
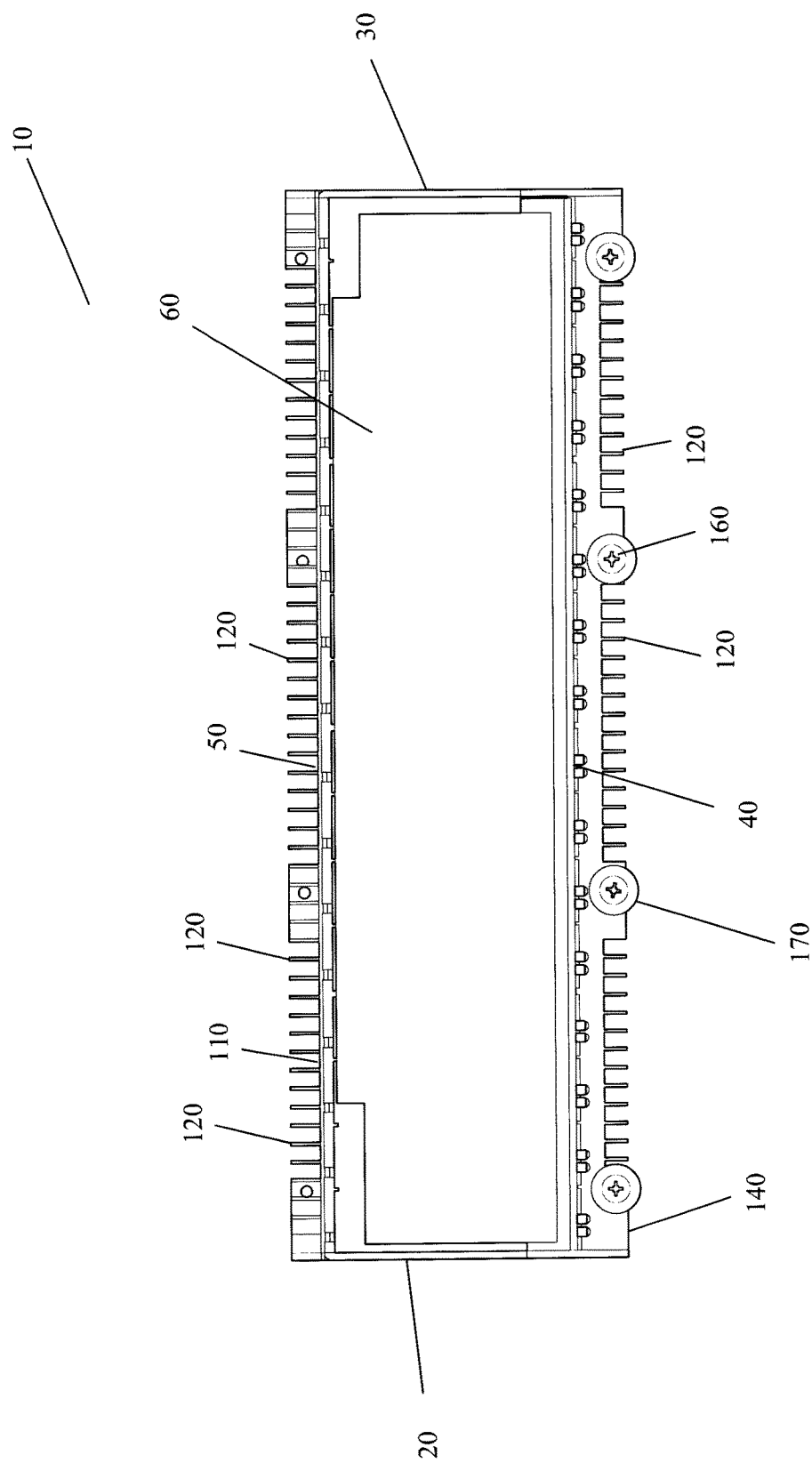
FIG. 6 is a front view thereof wherein a circuit board is attached.
Figure 7:
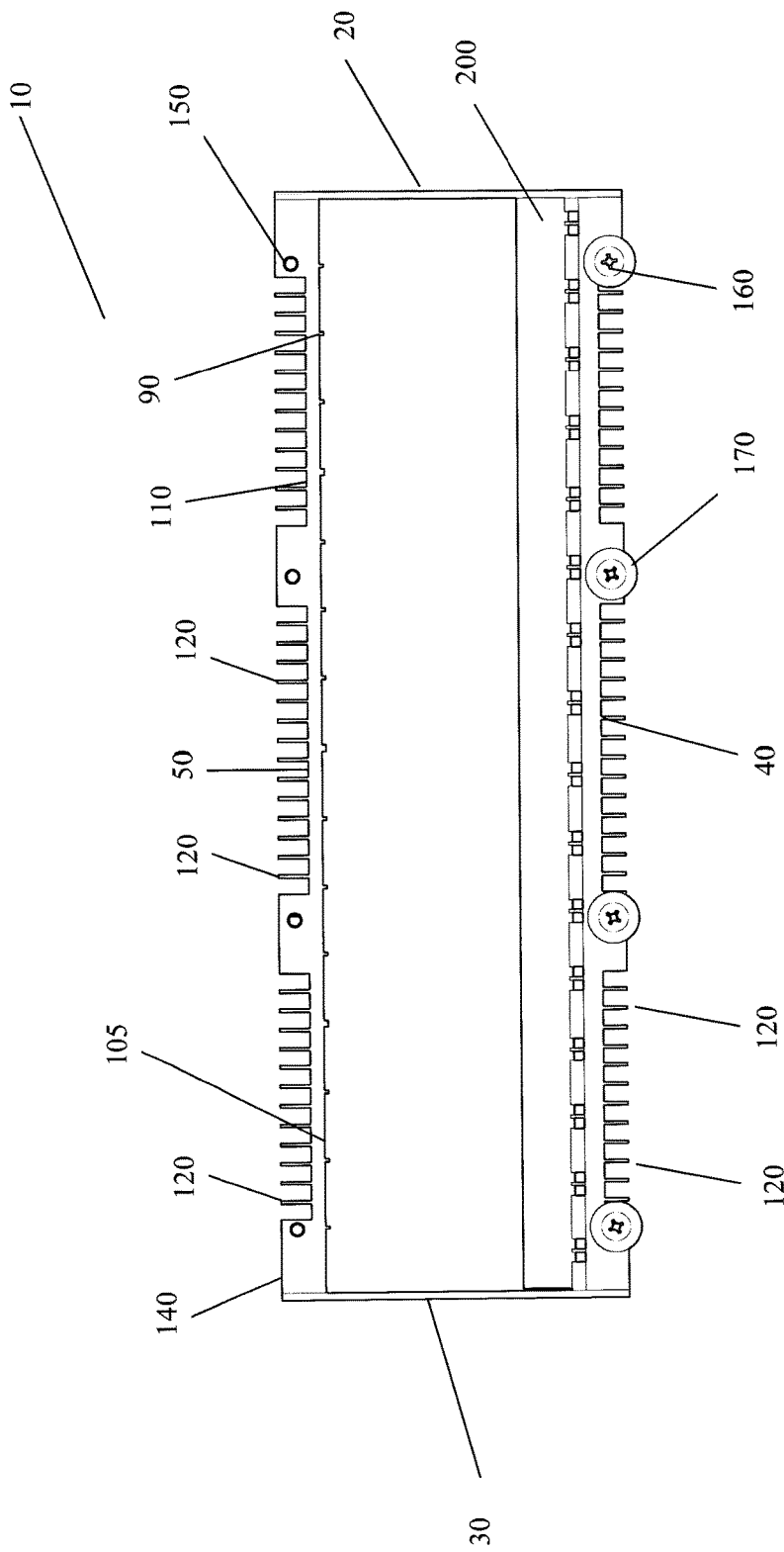
FIG. 7 is a back view thereof.
Figure 8:
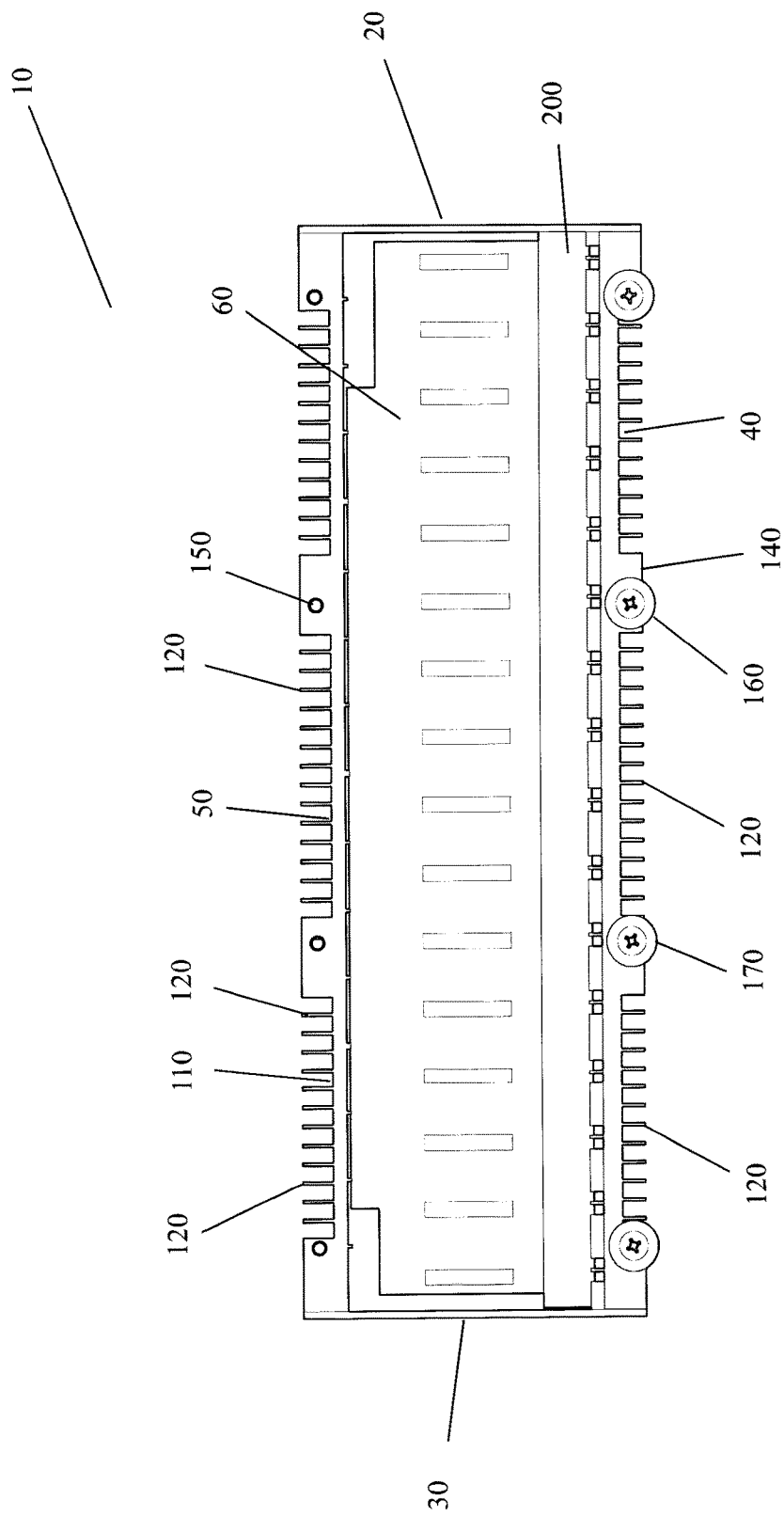
FIG. 8 is a back view thereof wherein a circuit board is attached.
Figure 9:
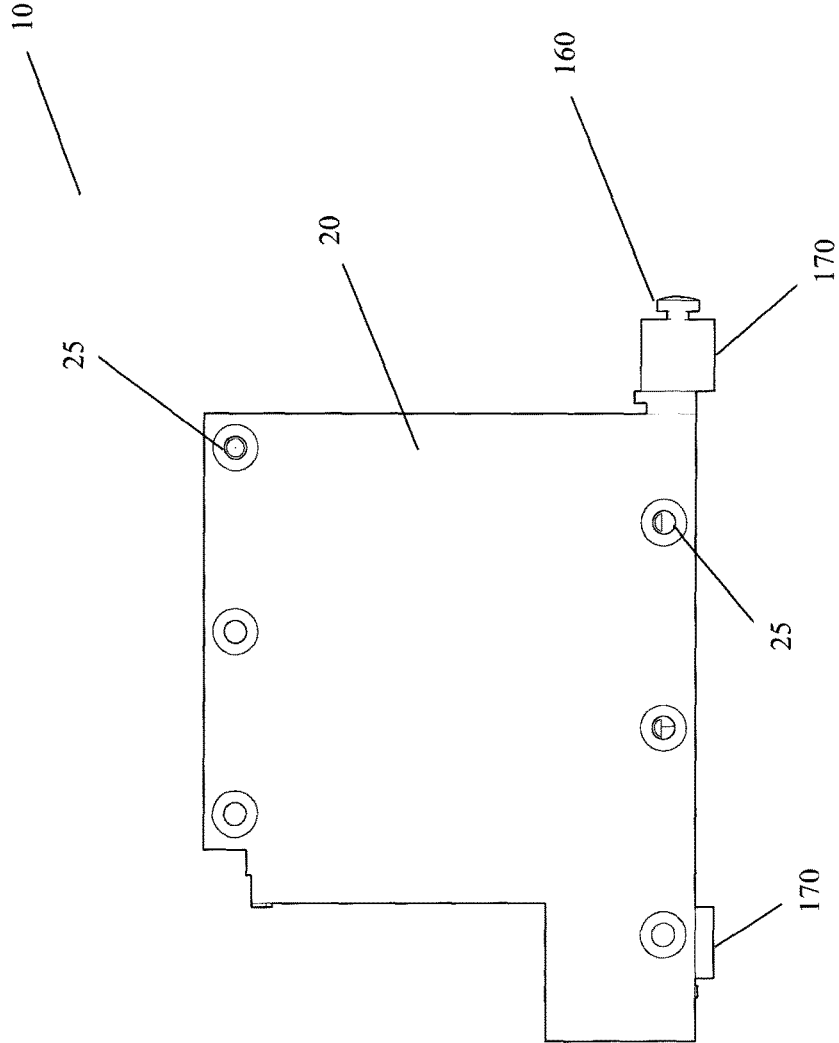
FIG. 9 is a side view thereof.
Figure 10:
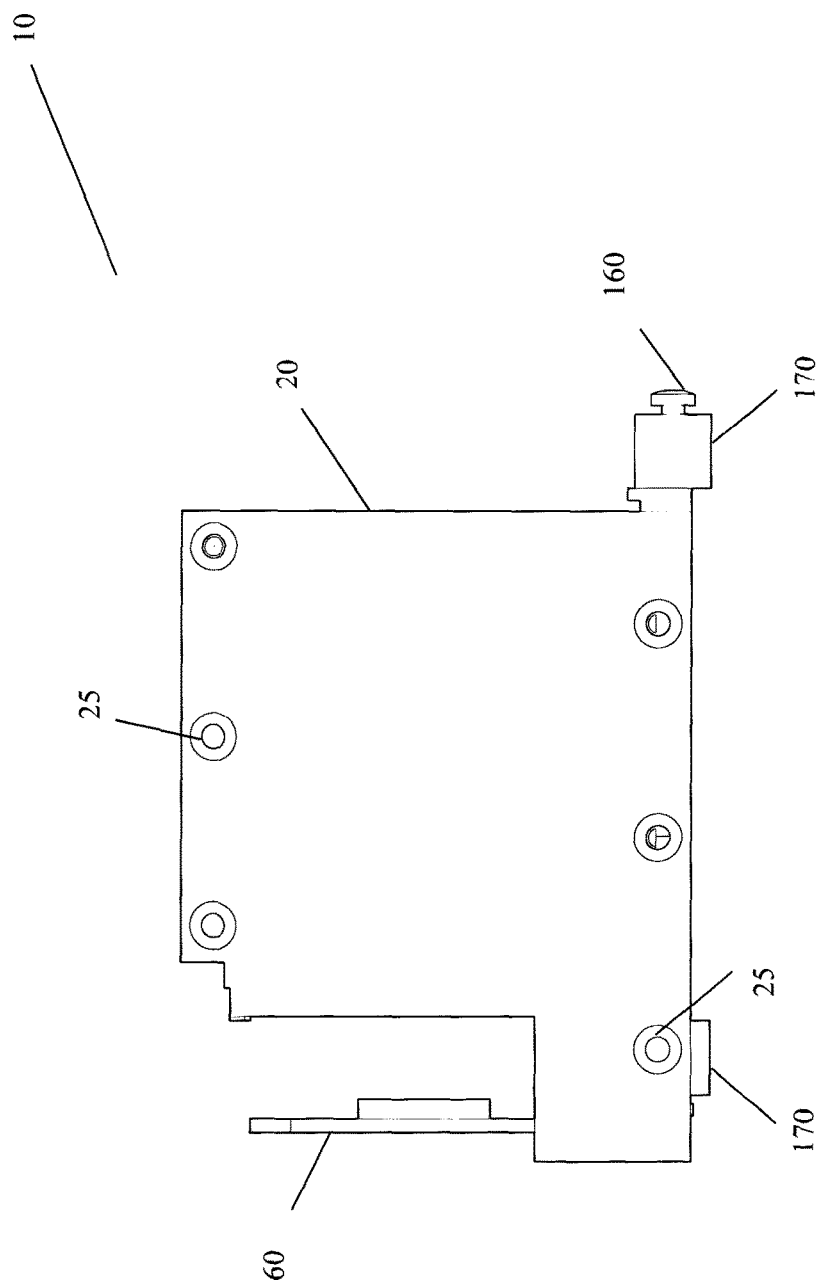
FIG. 10 is a side view thereof wherein a circuit board is attached.
Figure 11:
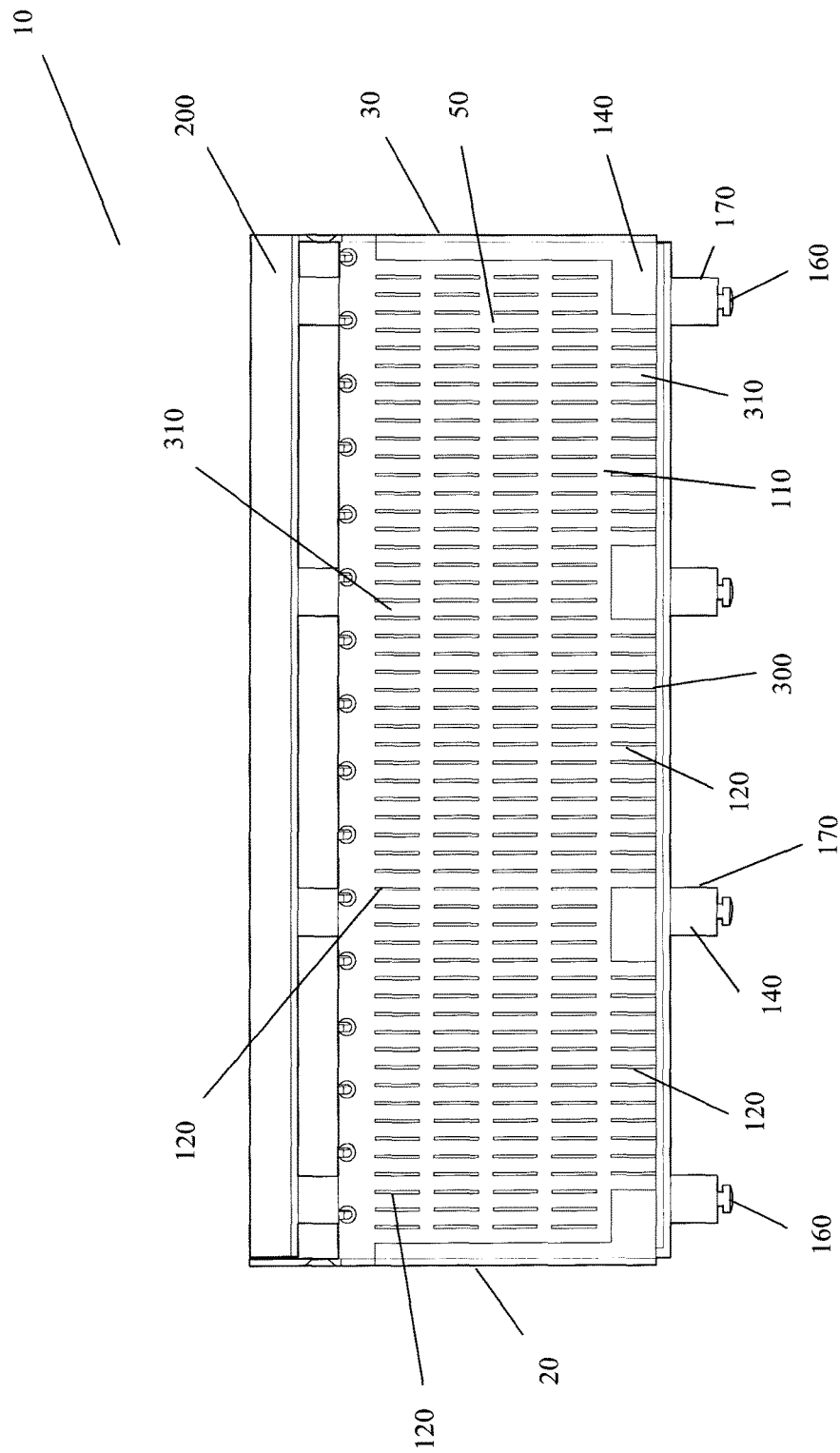
FIG. 11 is a top view thereof.
Figure 12:
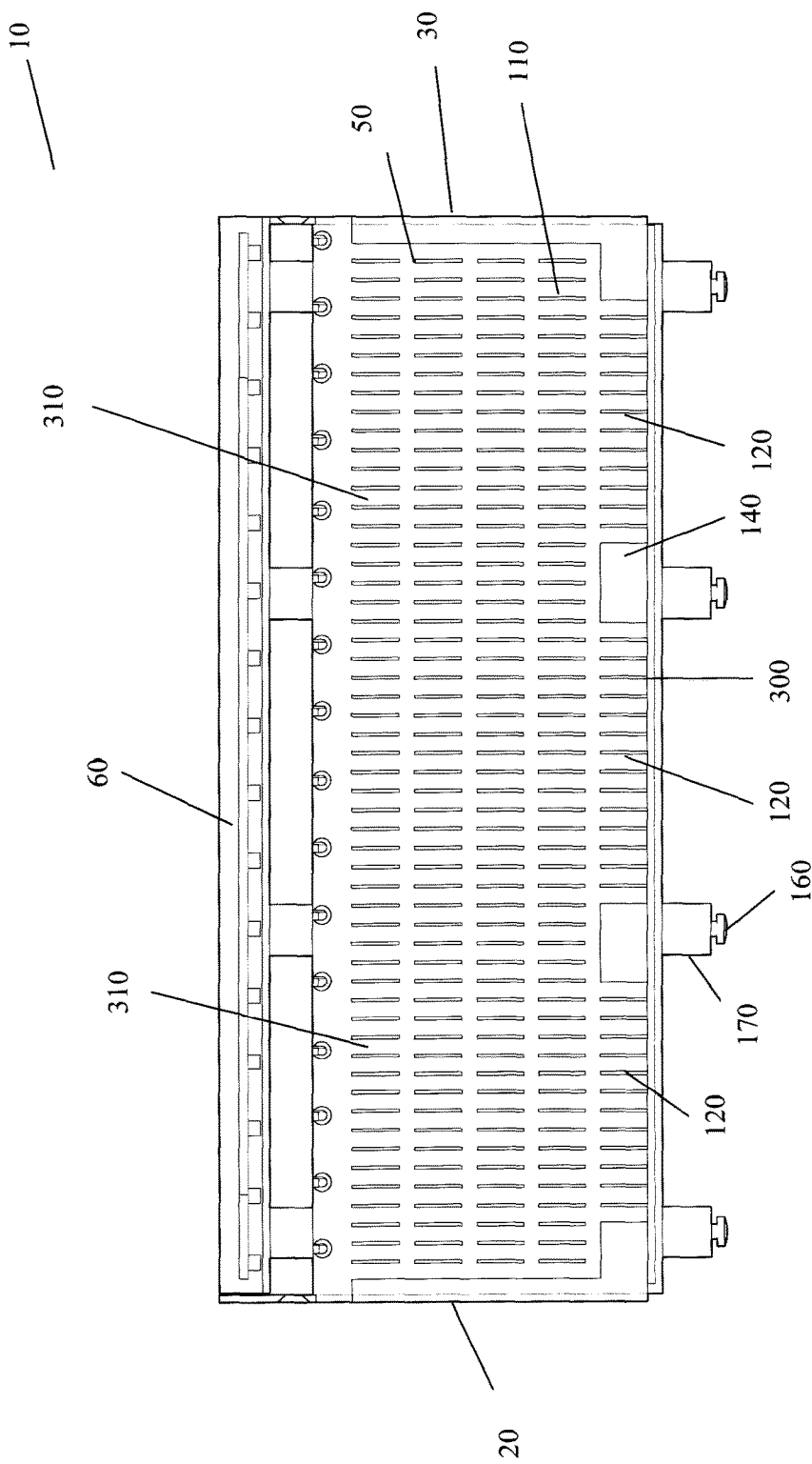
FIG. 12 is a top view thereof wherein a circuit board is attached.
Figure 13:
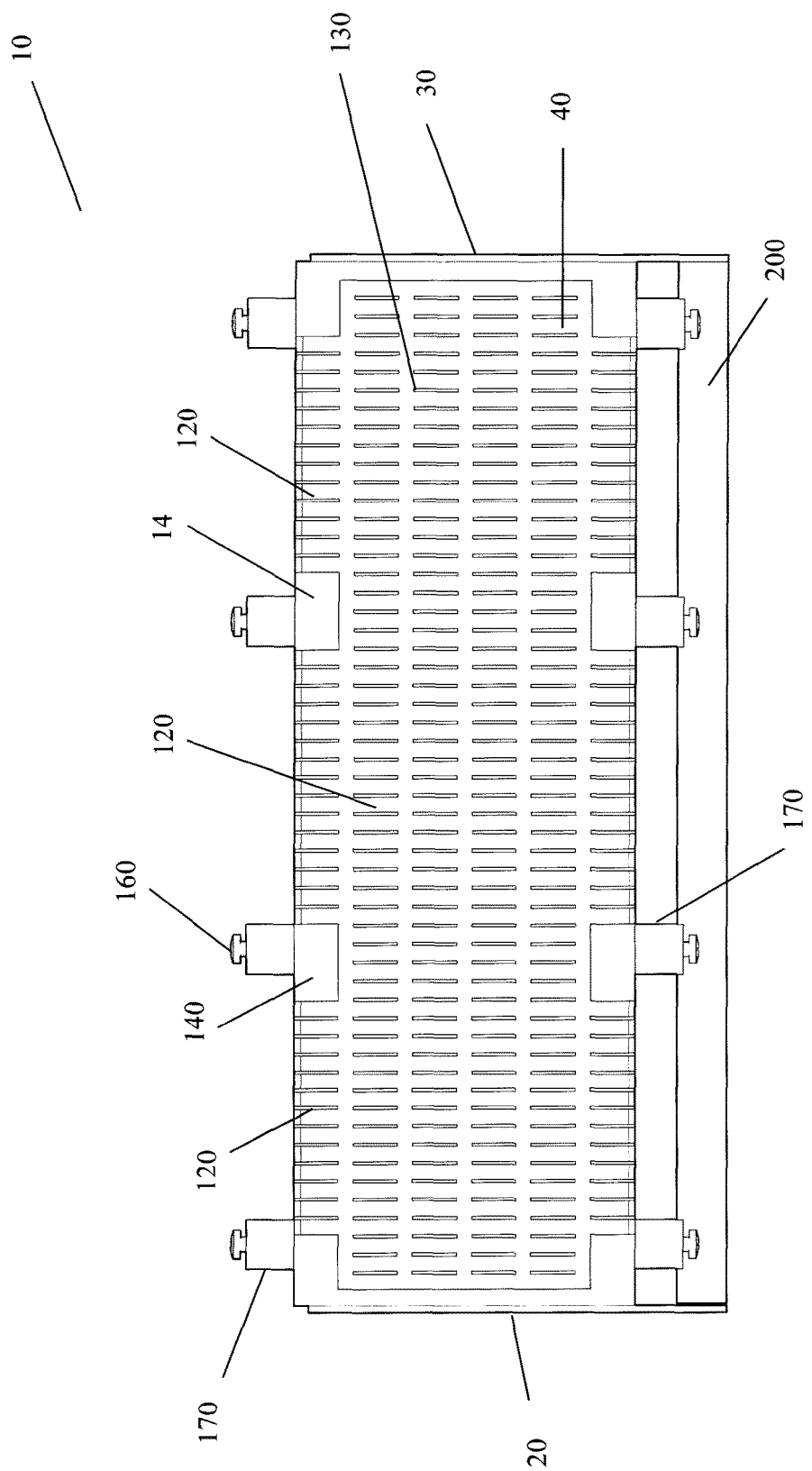
FIG. 13 is a bottom view thereof.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

An embodiment of a drive array according to the invention is shown in FIGS. 1 through 14. Array 10 includes first side panel 20 and second side panel 30, base 40 and top panel 50. Circuit board 60, as shown in FIGS. 2, 4, 6, 8, 10 and 12, is positionable at the back of array 10, and should have the circuitry needed for allowing drives inserted in array 10 to communicate with a server or other computer. Circuit board 60 is normally a back plane circuit board. Side panels 20, 30 include a plurality of apertures 25 for allowing screws, or other attachment means such as dowels, to attach side panels 20, 30 to base 40 and top panel 50, although in alternative embodiments side panels 20, 30 may be glued or form fitted to base 40 and top panel 50, or array 10 could be manufactured using molding, or base 40 and top panel 50 may have grooves to receive and hold side panels 20, 30.

Top panel 50 may, for example, be one quarter of an inch thick (or alternatively could be from one eighth to a half of an inch) and base 40 may be, for example, three eighths of an inch (or alternatively could be from one quarter to a half inch) thick.

The distance from first side panel 20 and second side panel 30 define a length of array 10. Array 10 may have a length to house a specified number of hard drives, typically, 8, 16 or 24. Side panels 20 and 30 have a depth somewhat less than the length of the hard drive to be inserted to allow the hard drive to be positioned within array 10 transverse to the length of array 10. Array 10 may be shaped and sized to house a particular size of hard drives securely, for example 2.5 or 3.5 inch hard drives. The hard drives may be spinning drives or SSDs.

Figure 14:
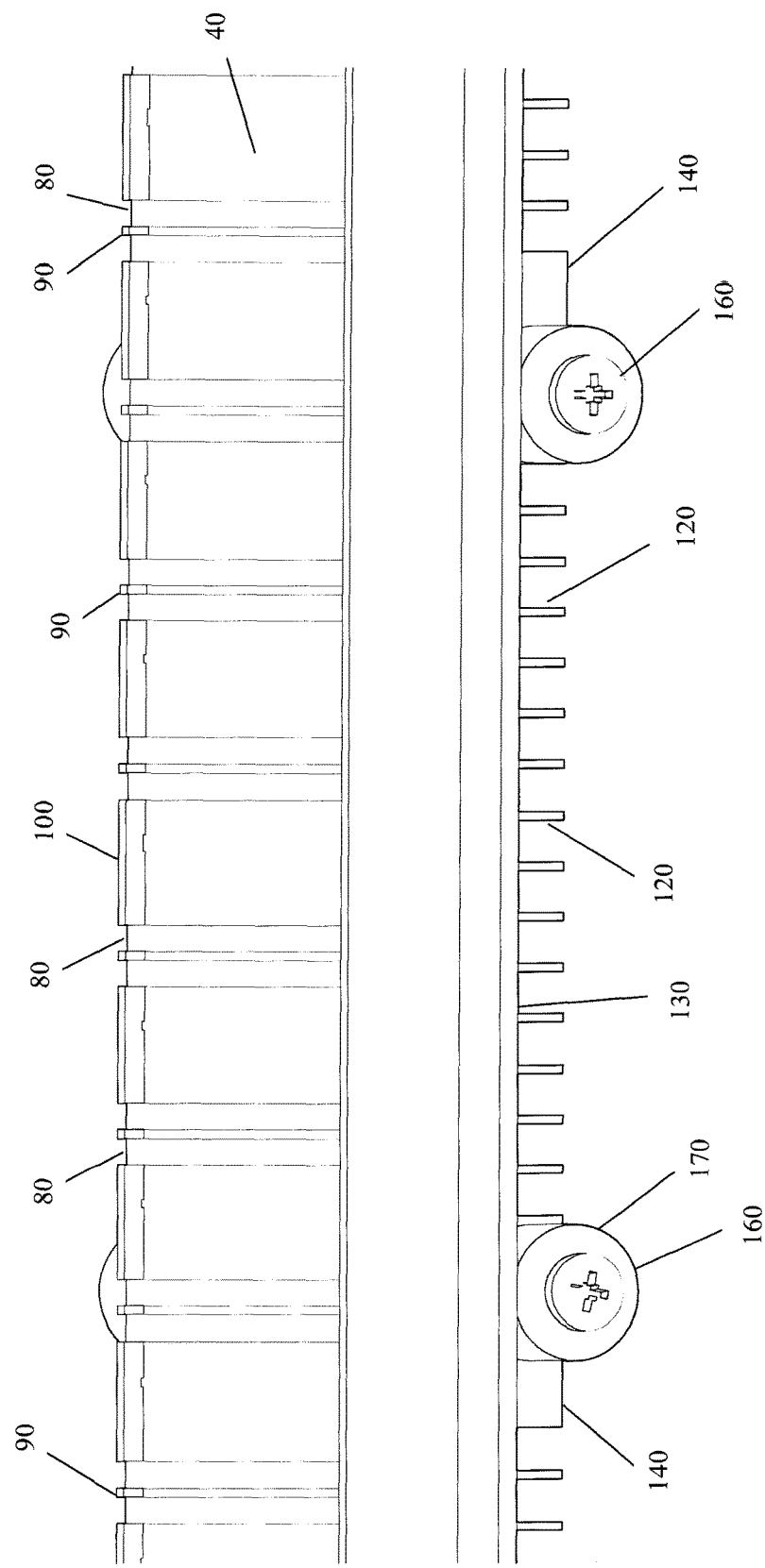
FIG. 14 is a partial front view of a base of a drive array according to the invention.

As shown in FIG. 14, the top side 100 of base 40 includes grooves 80 and raised projections 90 transverse to the length of array 10. Projections 90 are positioned to receive and support the hard drives and extend upwardly from base 40, for example, by about one sixteenth of an inch, and may be, for example, about one sixteenth of an inch wide. Alternatively projections 90 could be sized differently to fit different sizes of hard drives. Projections 90 are spaced to fit and separate the hard drives positioned in array 10. Grooves 80 may be, for example, one eighth by a quarter of an inch and allow for the securing of the hard drives into array 10 with, for example, screws.

The bottom side 105 of top panel 50 has projections 90 and grooves 80 positioned to align with projections 90 and grooves 80 on base 40, thereby allowing for ease of insertion of the hard drives into the slots defined by projections 90 on both top and panel 50 and base 40. The depth of base 40 and top panel 50 may be less than that of the hard drives thereby allowing the hard drives to removed and inserted by hand without difficulty, but should be sufficiently deep to support the hard drives.

Top side 110 of top panel 50 has a plurality of projections, such as fins 120 to assist with heat dissipation. In an embodiment of the invention, fifty three rows of fins are present, each row having five fins, or less if an obstacle is present Other embodiments of the invention may include variations, for example fewer rows of fins, for example forty, or more rows of fins, such as sixty five rows of fins. Each row may have four, six or more fins. Bottom side 130 of base 40 also has a plurality of fins 120 arranged to align with the fins 120 on top panel 50, or alternatively in a pattern different from that described in relation to top panel 50, but still representing a plurality of fins or other projections. Fins 120 are arranged transversely to the length of array 10, but may be positioned at other angles. Fins 120 are spaced far enough apart to allow air to circulate freely around them.

The total number of fins 120 may be evenly split between top panel 50 and base 40 (for example 265 on each). Fins 120 may extend upwardly from top panel 50 and downwardly from base 40, about a half inch from top panel 50 or base 40. Fins 120 may be arranged in rows 300 transverse to the length of array 10, and between each row is a channel 310 which may, for example, be approximately a quarter inch wide. These channels 310 allow air to circulate amongst the fins and thereby cool the fins.

Each fin 120 may, for example, be approximately one-sixteen of an inch thick and two thirds of an inch long; alternate sizes of fins include from one-thirtysecond to three sixteenths of an inch thickness and one inch to half an inch long.

Both top side 110 of top panel 50 and bottom side 130 of base 40 have a plurality of blocks 140 (for example, four on top panel 50 and eight on base 40) which may be positioned at the back of the top panel 50 and at both the back and front of base 40. Blocks 140 may include an outward aperture 150 to receive screws 160. At the back of array 10, blocks 140 on top panel 50 can be used to secure circuit board 60.

Blocks 140 on base 40 in both the front and back of array 10 may support shock elements (not shown) that are positionable parallel to the length of array 10. The shock elements are secured to base 40 by screws 160 entering blocks 140. Alternatively, or in addition to the shock elements, screws 160 may pass through rubber washer 170. In the embodiment shown a single rubber washer is shown, although more may be used. Shock elements and/or rubber washers 170 are placed at both the back and front of array 10 to elevate array 10, allowing air to pass under base 40 and by fins 120. Shock elements and/or rubber washers 170 also reduce the transfer noise and vibration from the hard drives in array 10.

Fans (not shown) may be used to provide air flow. As few as four 4 inch fans are sufficient to maintain the temperature of the drives to within specifications, although more or less fans of varying size may be used.

Array 10 may be made of a metal, such as aluminium having high heat conductivity and a light weight. As the hard drives, when placed in array 10, may be in direct contact with top panel 50 and base 40, heat is transferred directly to panel 50 and base 40 respectively and then to fins 120.

Base 40 of array 10 may include extension member 200 defining an edge for supporting back plane circuit board 60. Circuit board 60 allows the hard drives to be individually powered and connected to the server. The hard drives may be removed individually while the server to which they are connected continues to operate.

In an alternative embodiment of the invention, Plastic light rods may be inserted in or by each groove 80 to provide for drive warning and drive use lights for the hard drives placed in the corresponding slot.

Figure 15:
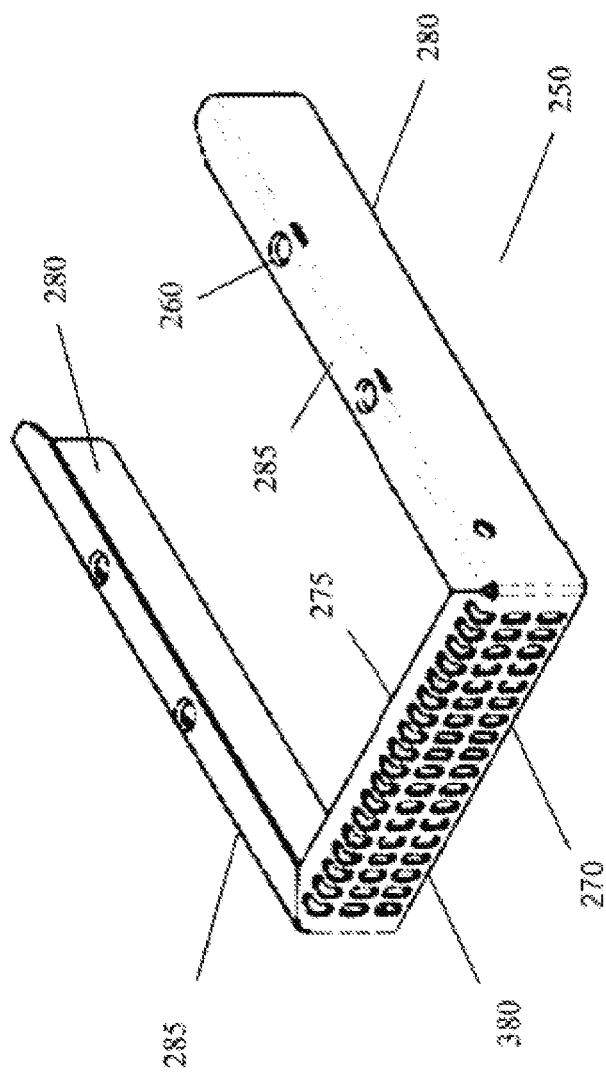
FIG. 15 is a front perspective view of an embodiment of a drive bracket according to the invention.
Figure 16:
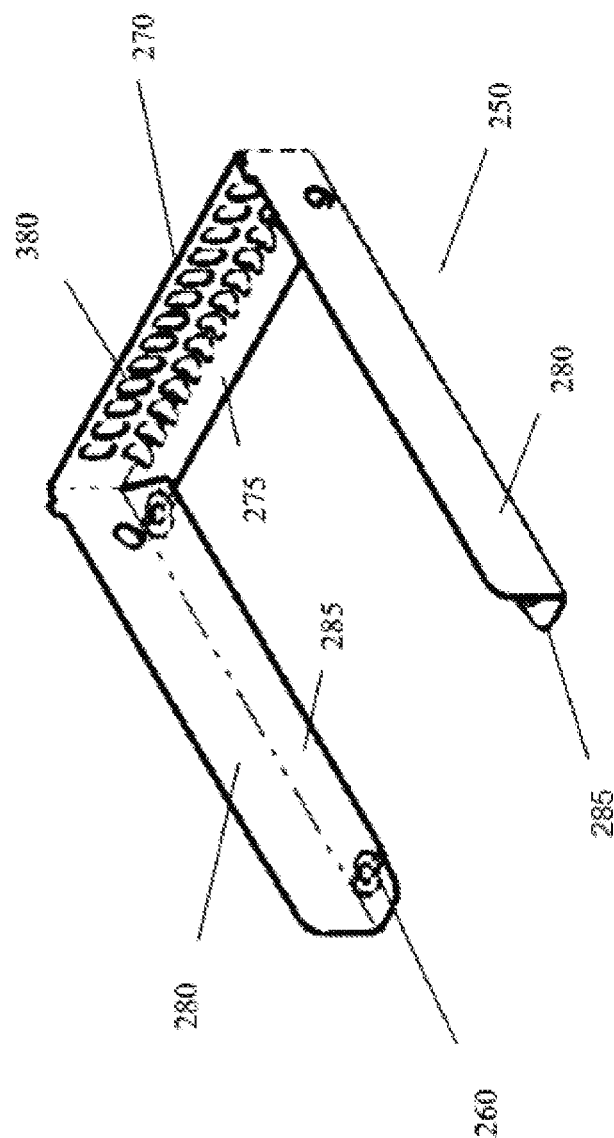
FIG. 16 is a rear perspective view thereof.

As shown in FIGS. 15 and 16, a hard drives in array 10 may be used with hard drive trays, such as hard drive tray 250. Hard drive tray 250 allows the hard drive to be fastened, for example with screws, to hard drive tray 250 through apertures 260 which fix the hard drive in place within tray 250. Tray 250 is sized to prevent hard drives from being pushed through array 10 to contact and perhaps damage circuit board 60.

Hard drive tray 250 may include front 270, and arms 280. Both front 270 and arms 280 include a corresponding edge 275, 285 transverse to front 270 and arms 280 to keep the drive in position. Hard drive tray 250 may also assist in cooling the hard drives by providing better contact to the overall heat sink drive array 10, while also adding an additional cooling surface at the front 270 of the drive by allowing air to pass through perforations 380 in tray 250. Trays 250 also ensure that the hard drives are centered, secured from moving forward to prevent damage to back plane circuit board 60, and cannot move around in an individual drive slot in array 10. Top panel 50 and/or base 40 may have projections along the length at the back edge of respective top panel 50 or base 40 to block tray 250 and prevent tray 250 from contacting circuit board 60.

Figure 17:
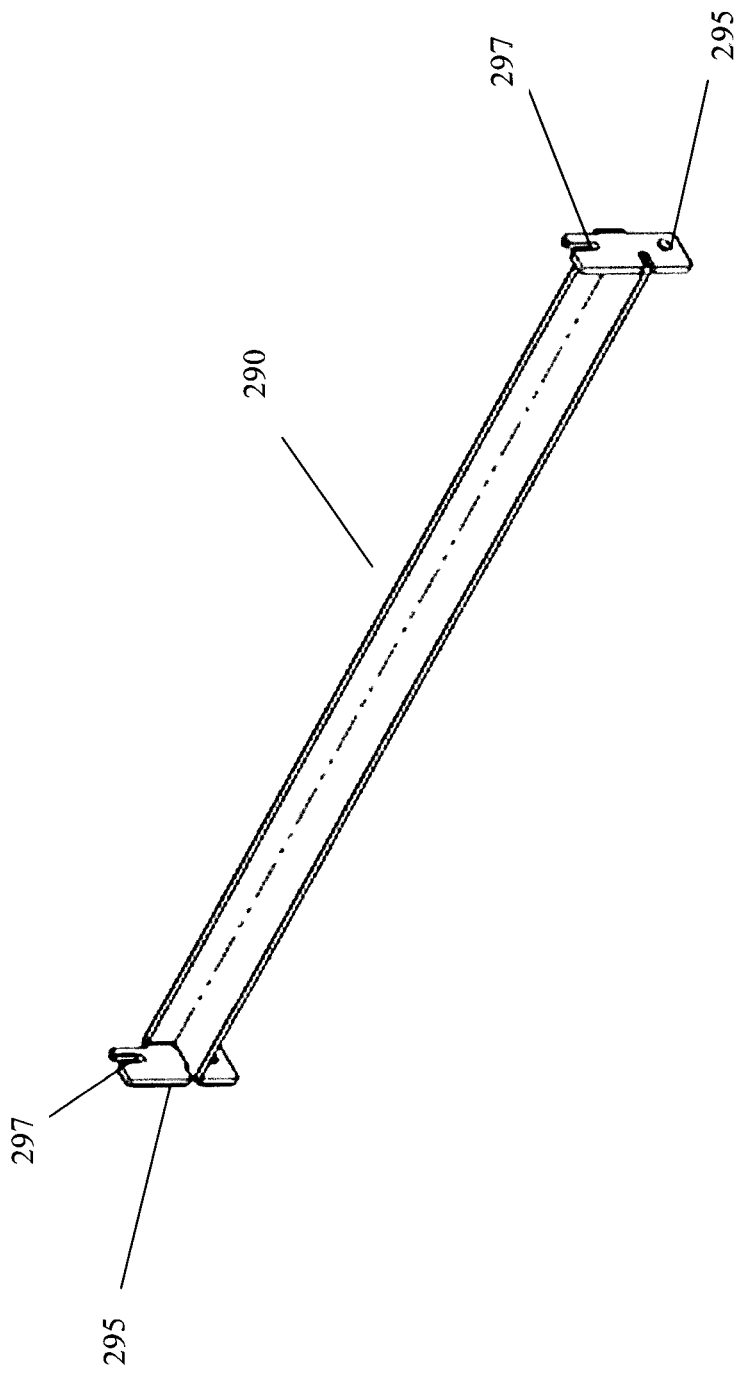
FIG. 17 is a perspective view of an embodiment of a cross bar according to the invention.

Cross-bar 290 as shown in FIG. 17 may be used to ensure that the inserted hard drives, either within trays 250 or not, in array 10 cannot move out of their respective slots. Cross-bar 290 is positionable at the front of array 10 and serves to "lock" the hard drives or hard drive trays 250 in place. Cross bar 290 may be secured to array 10 by screws via end members 295 or other means. Slots 297 in end members 295 are sized to fit into a pins (not shown) in array 10, after which screws or other fastening means can be used to secure cross bar 90 to array 10. Cross-bar 290 also provides an additional cooling surface as well as protecting the hard drives in array 10 from sliding out.

The above-described embodiments have been provided as examples, for clarity in understanding the invention. A person with skill in the art will recognize that alterations, modifications and variations may be effected to the embodiments described above while remaining within the scope of the invention as defined by claims appended hereto.

The invention claimed is:

1. A drive array, comprising:
   a. a structure including a top panel, a base; and first and second side panels; the first and second side panels positioned on opposite sides of the array and defining a length of the array;
   b. a first plurality of fins extending upwardly from the top panel and arranged transversely to the length of the array, the first fins further arranged in a plurality of rows, each of the rows transverse to the array;
   c. a second plurality of fins extending downwardly from the base and arranged transversely to the length of the array, the second fins further arranged in a plurality of rows, each of the rows transverse to the array;

d. a plurality of projections extending upwardly from the base aligned with a plurality of projections extending downwardly from the top panel, positioned to define slots to fit and hold hard drives;

e. a first plurality of blocks positioned on the top panel; and f. a second plurality of blocks positioned on the base and supporting a plurality of shock elements, rubber washers, or both.

2. The drive array of claim 1 further comprising a circuit board secured to the back of the structure to communicate with the hard drives positioned on the array.

3. The drive array of claim 1, wherein the projections are positioned to hold a $3^{1/2}$ inch hard drive.

4. The drive array of claim 1 wherein the projections are positioned to hold a $2^{1/2}$ inch hard drive.

5. The drive array of claim 1 wherein the base is elevated on the second plurality of blocks.

6. The drive array of claim 1 further comprising the plurality of rubber washers secured to the base on opposite sides of the array on the second plurality of blocks to secure one of the hard drives.

7. The drive array of claim 1 further comprising a groove in the base, the groove positioned to receive and support one of the hard drives.

8. The drive array of claim 7 further comprising a cross bar positionable at a side of the array opposite the groove to lock the hard drives into position.

9. The drive array of claim 1 further comprising a tray sized to fit in the slots, the tray sized to receive and hold one of the hard drives.

10. The drive array of claim 9 wherein a front side of the tray comprising a plurality of perforations to allow air flow to the hard drives therein.

* * * * *